US009301330B2

(12) United States Patent
Dochow et al.

(10) Patent No.: US 9,301,330 B2
(45) Date of Patent: Mar. 29, 2016

(54) METHOD FOR MOBILE RADIO COMMUNICATION AND COMMUNICATION DEVICE

(71) Applicants: Gerhard Dochow, Wetzlar (DE); Andreas Lotz, Wetzlar (DE)

(72) Inventors: Gerhard Dochow, Wetzlar (DE); Andreas Lotz, Wetzlar (DE)

(73) Assignee: Continental Automotive GmbH, Hannover (DE)

( * ) Notice: Subject to any disclaimer, the term of this patent is extended or adjusted under 35 U.S.C. 154(b) by 0 days.

(21) Appl. No.: 14/380,773

(22) PCT Filed: Feb. 26, 2013

(86) PCT No.: PCT/EP2013/053757
§ 371 (c)(1),
(2) Date: Aug. 25, 2014

(87) PCT Pub. No.: WO2013/127755
PCT Pub. Date: Sep. 6, 2013

(65) Prior Publication Data
US 2015/0024764 A1    Jan. 22, 2015

(30) Foreign Application Priority Data

Mar. 1, 2012    (DE) .......................... 10 2012 203 231

(51) Int. Cl.
*H04W 72/00*    (2009.01)
*H04W 76/02*    (2009.01)
*H04B 7/02*    (2006.01)

(52) U.S. Cl.
CPC ............. *H04W 76/025* (2013.01); *H04B 7/024* (2013.01); *H04W 76/028* (2013.01)

(58) Field of Classification Search
CPC ....................................................... H04B 7/024
See application file for complete search history.

(56) References Cited

U.S. PATENT DOCUMENTS

| | | | |
|---|---|---|---|
| 3,794,766 A * | 2/1974 | Cox et al. ........................ | 381/66 |
| 2002/0154632 A1 | 10/2002 | Wang et al. | |
| 2004/0049104 A1* | 3/2004 | Kishi ............................. | 600/301 |
| 2005/0070287 A1 | 1/2005 | Cave et al. | |
| 2008/0101567 A1* | 5/2008 | Baudino ........... | H04M 3/42348 379/114.01 |
| 2010/0046473 A1 | 2/2010 | Kozakai et al. | |
| 2011/0069618 A1* | 3/2011 | Wong ................. | H04W 76/022 370/244 |
| 2011/0222536 A1 | 9/2011 | Saavedra | |
| 2012/0113878 A1* | 5/2012 | Yu ....................... | H04W 52/325 370/311 |

FOREIGN PATENT DOCUMENTS

| | | | |
|---|---|---|---|
| DE | 19924718 A1 | 12/2000 | |
| DE | 101 33 590 A1 | 10/2002 | |

(Continued)

*Primary Examiner* — Sam K Ahn
*Assistant Examiner* — Fabricio R Murillo Garcia
(74) *Attorney, Agent, or Firm* — Cozen O'Connor

(57) ABSTRACT

A method for mobile radio communication between a communication partner device and a mobile communication device includes conducting a communication, at least temporarily, via at least two different mobile radio connections in two different mobile radio networks; evaluating the reception quality of receive signals of each mobile radio connection in the mobile communication device; selecting the mobile radio connection with the best reception quality for the mobile radio communication, at least in a receiving direction; deriving different audio signals from the receive signals of the different mobile radio connections; and feeding the derived different audio signals to a delay circuit, which aligns transit time differences and/or the amplitude differences of the derived different audio signals with respect to one another.

10 Claims, 1 Drawing Sheet

(56) References Cited

FOREIGN PATENT DOCUMENTS

| EP | 0695104 | A2 | 1/1996 |
|----|---------|----|--------|
| EP | 0719064 | A2 | 6/1996 |
| EP | 1095468 |    | 5/2001 |
| EP | 1 586 206 | B1 | 10/2005 |
| EP | 1919136 | A1 | 5/2008 |

* cited by examiner

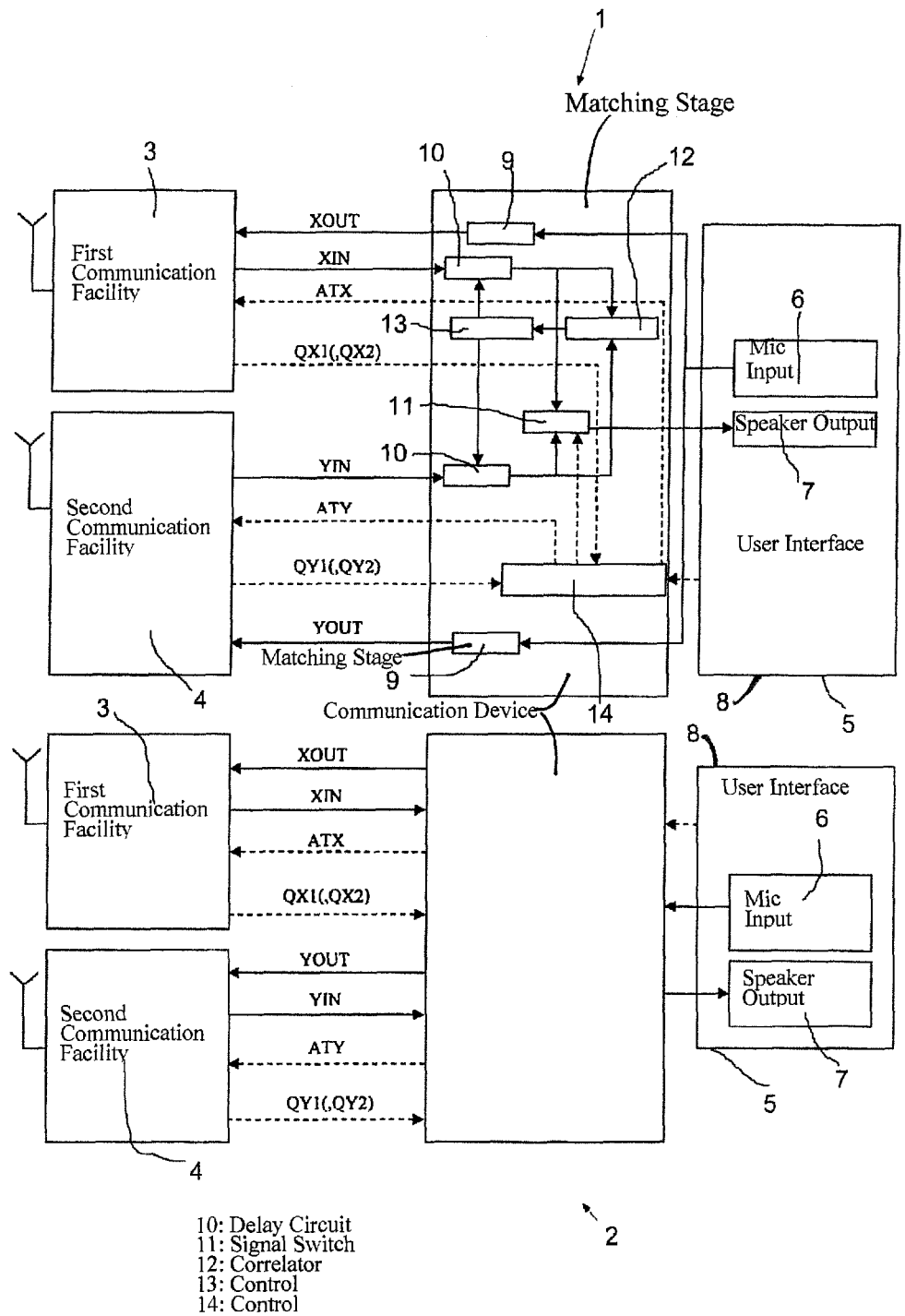

METHOD FOR MOBILE RADIO COMMUNICATION AND COMMUNICATION DEVICE

CROSS-REFERENCE TO RELATED APPLICATIONS

This is a U.S. national stage of application No. PCT/EP2013/053757, filed on 26 Feb. 2013, which claims priority to the German Application No. DE 102012203231.2 filed 1 Mar. 2012, the content of both incorporated herein by reference.

BACKGROUND OF THE INVENTION

1. Field of the Invention

The invention relates to a method for mobile radio communication between a communication partner device and an in particular mobile communication device, and also a mobile communication device, configured to carry out the method, wherein one of the communication devices is the calling communication device and the other of the communication devices is the receiving communication device. In other words, both the communication partner device and the mobile communication device can be the calling or the receiving communication device.

In order to carry out the method, at least the in particular mobile communication device, i.e., for example, a mobile radio telephone, is equipped according to the invention for audio communication with at least two communication facilities for setting up different mobile radio connections. In the proposed method, a communication is conducted at least temporarily, for example during the connection set-up and/or with decreasing reception quality, or permanently, via at least two mobile radio connections in at least two different mobile radio networks, wherein the reception quality of the receive signals of each mobile radio connection is evaluated in the mobile communication device and the mobile radio connection with the best reception quality is selected for the mobile radio communication, at least in the receiving direction. The communication facility is a transmit and receive facility for a mobile communication, in particular for setting up mobile radio connections by means of a SIM card, via which the connection is set up to the mobile radio provider via the latter's mobile radio network. Here, a communication facility in each case has its own mobile radio number on which the device can be contacted.

2. Related Art

Mobile radio telephones are already known which can accommodate two SIM cards, wherein the user, before making a call, can select which SIM card is chosen with which telephone number for a call. This is used, for example, if a mobile radio telephone is used as both a company telephone and a private telephone, so that the user, before each call, can choose the account to which or the telephone number on which the call is to be booked. However, mobile telephones of this type cannot usually set up two different mobile radio connections simultaneously.

A problem with mobile radio telephone calls consists in disconnected or disturbed connections between two mobile communication partners or one mobile communication partner and one non-mobile communication partner, for example due to the occurrence of radio holes which, even today, are still an everyday occurrence. No mobile radio provider can currently offer blanket mobile radio coverage. Many disturbances of the reception situation result in disconnection of an existing mobile radio connection and require a re-establishment of the mobile radio connection, possibly during an automobile journey.

Most mobile radio telephones available on the market have only one SIM card and one communication facility. A disconnected connection triggered by deterioration of the reception situation can then be restored only by the re-establishment of the connection, but this is usually successful only if the reception situation of the mobile radio device has been improved, for example through a change of location.

In the known mobile telephones with two SIM cards, the user can switch over manually between two mobile radio providers, insofar as the SIM cards inserted into the mobile radio telephone originate from different providers. Since the network coverage at a given location is typically different for different providers, a changeover of provider following a disconnected connection can often result in an improved speech quality. However, it is very annoying for the user that the connection is first disconnected and a re-establishment of the call then has to be initiated manually.

EP 0 695 104 B1 describes a method for transferring a telephone call made on a mobile telephone from a first mobile communication connection to a second mobile communication connection if the first mobile communication connection is disconnected because, for example, the quality of the connection has deteriorated to the extent that a disconnection of the first mobile communication threatens. To do this, the mobile telephone has two different communication systems which can set up the first and the second communication connection in parallel. This is carried out on request by a remote communication center, which initiates a conference call circuit with which the mobile telephone can be called simultaneously on the first and the second communication connection, so that the better of the two communication connections can be selected. However, this requires that the mobile radio provider offers corresponding technical facilities, which are usually available only in comparatively expensive tariffs.

From DE 101 33 590 A1, a method is known for switching over between a plurality of SIM cards in a mobile telephone, in which a service provider identification number is allocated to a SIM card, and the mobile telephone, on receiving such a service provider identification number, switches over to the SIM card allocated to the latter, for example if, during a journey abroad, a corresponding different service provider is available.

SUMMARY OF THE INVENTION

An object of the present invention is to improve the connection quality of a mobile radio connection in a user-friendly manner.

This object is achieved according to the invention by a method and a mobile communication device configured to carry out the method, as described herein.

For the method proposed according to an aspect of the invention, it is provided in particular that the audio signals derived from the respective receive signals of different mobile radio connections are fed in the mobile communication device to a delay circuit, which aligns the transit time differences and/or the amplitude differences of the different audio signals with one another. This procedure is also referred to below as "synchronization of the receive signals".

Through this synchronization, a switchover between the receive signals is possible without the user of the mobile communication device, or a mobile radio telephone, which is used below synonymously with the term "mobile communication device", noticing this switchover or having to take action for this switchover, for example by pressing a key to confirm the switchover. Since the mobile communication device has two separate communication facilities with which different mobile radio connections can be set up simultaneously and in parallel in order to transmit the same voice signals according to the invention, the switchover between the different mobile radio connections can also take place independently of functions or services of a communication provider (mobile radio provider), for example a conference call function, which is often offered only in expensive tariffs or at an additional charge. If, on the other hand, only one receive signal of one mobile radio connection is present, for example because the other mobile radio connection has not been set up or has been disconnected, obviously no alignment of the different receive signals takes place.

In a first simple design of the method proposed according to the invention, it can be provided that both or the plurality of communication facilities of the calling communication device attempt in each case to set up a mobile radio connection to the communication partner device on the same telephone number, wherein a check is then carried out on the reception quality only during the connection set-up, and the mobile radio connection with poorer reception quality is terminated immediately before the communication connection is completely set up. This case may occur, for example, if mobile communication devices wish to set up a mobile radio communication with a fixed-network communication partner device. In this case, the reception quality is decisively determined by the quality of the radio path to the mobile communication device that ends in the respective feed point into the fixed network, and its quality can be determined directly in the connection set-up in the mobile radio cell. However, a dynamic change in the reception quality during the call can no longer be taken into account in this simplest method variant.

The called party often has different communication devices, which can be operated simultaneously, for example a fixed-network telephone in the office and a mobile telephone lying on the desk. In this case, it is also possible that the mobile communication device simultaneously calls both telephone numbers and selects the mobile radio connection with the best reception quality for the receive signal or the call.

However, in a particularly preferred application of the present invention, the communication partner device of the mobile communication device is also equipped with at least two communication facilities for setting up different communication connections, wherein a first communication connection takes place between the first communication facilities of the mobile communication device and of the communication partner device, and a second communication connection takes place between the second communication facilities of the mobile communication device and of the communication partner device.

If further communication facilities are available, where appropriate, in the communication devices, a corresponding situation applies according to the invention to the further communication channels, wherein a communication channel is understood in each case to mean a communication connection between the one communication facility of the mobile communication device and a communication facility of the communication partner device, i.e., a mobile radio connection.

The communication preferably takes place in the case of two existing, in each case two-way, mobile radio connections in such a way that each communication device transmits and receives in each case on both communication channels, i.e., via the two established mobile radio connections. As described, the receive signals are synchronized according to the invention so that at least one, but preferably each, of the communication devices selects the receive signals according to the connection quality. As long as both mobile radio connections exist, the transmit signals are transmitted according to the invention via both mobile radio connections.

In the connection set-up, the calling communication device can in each case select, with each of its communication facilities, a dedicated telephone number allocated to the respective communication facility of the communication partner device as the receiving or called communication device. As long as both communication channels, i.e., both mobile radio connections, can be maintained in parallel in this way, it is possible to switch over at any time between the two communication channels due to the synchronization of the receive signals without the user noticing this. The different telephone numbers or subscriber numbers can be entered, for example, via a user interface during a call set-up, i.e., the user is prompted when dialing to enter the subscriber numbers for the mobile radio connections to be used. Additionally or alternatively, the subscriber numbers can also be contained in electronic telephone directories and, for example, can be selected automatically, in particular if a second subscriber number to be used in parallel is allocated to a first subscriber number and/or an option is activated to set up a communication via two parallel mobile radio connections.

According to the invention, the method described in detail below relates particularly preferably to the case where both the mobile communication device and the communication partner device, i.e., both the calling and the receiving communication device, in each case have at least two communication facilities which are preferably configured according to the invention, as previously described, to feed the audio signals derived from receive signals of the different mobile radio connections to a delay circuit, which aligns the transit time differences and/or the amplitude differences of the different audio signals with one another. If necessary, the further options described above or below can also be implemented. However, the person skilled in the art recognizes that a multiplicity of the particularly advantageous designs described below are also feasible and appropriate if only the mobile communication device as a communication partner is equipped with the plurality of parallel-operating communication facilities according to the invention. The options that can also be implemented in this case then relate to this invention variant also.

To set up a communication, in particular a call, but, where appropriate, a data connection also, a mobile radio connection can be set up according to the invention by the at least two communication facilities of the calling communication device in each case in parallel, i.e., simultaneously, and, once each connection has been set up, the reception quality of the receive signals at least of the calling or the receiving communication device can be evaluated. To do this, in particular, an integrated control is provided which decides, on the basis of the reception quality, which mobile radio connections, i.e., which communication channel, is selected for the receive signals. In this variant of the communication set-up, the receiving communication device or communication device called by the calling communication device behaves passively, i.e., it only receives the calls of the communication device to set up the different communication connections without autonomously setting up its own communication connection. Nevertheless, the receiving device, if it is equipped according to the invention to synchronize the receive signals, can also carry out the switchover of the receive signals between the two mobile radio connections.

Irrespective of the type of the communication set-up, this check is preferably carried out continuously as long as both mobile radio connections exist and receive signals are received via both mobile radio connections.

In an alternative variant for setting up the communication, it is possible for the receiving communication device, after receiving a call to set up a communication via the first mobile radio connection of the first communication facility, actively sets up a parallel second mobile radio connection via the second communication facility to the calling communication device. In this case, the communication devices, i.e., the mobile communication device and the communication partner device, which may also be designed as a mobile communication device, operate symmetrically. In both communication devices, the same methods are in each case carried out, irrespective of which communication device is the originally calling and which communication device is the originally receiving device, since each of the communication devices is equipped so that, following an incoming call, it autonomously starts a callback to the calling communication device via a different mobile radio connection. In order to provide the called or receiving communication device with the subscriber number for the callback, the calling communication device can, when dialing the receiving communication device, notify its subscriber number for the second mobile radio connection. This is particularly simple and can also be understood as a setting to define whether the calling communication device wishes to participate in the method according to the invention of a mobile radio communication with two autonomous, independent connections. The receiving communication device can then call back if this function is released generally or only for the subscriber number of the calling communication device. According to the invention, in order to avoid crossing calls of the two communication devices, a different time period can be specified in each communication device for the redial on busy.

In a preferred embodiment of the proposed method, the receiving communication device can, according to the invention, transmit information relating to the reception quality of the receive signals in the receiving communication device to the calling communication device, for example via a different data service of the mobile radio network, via which service, for example, control signals are transmitted. The data service can also be an SMS service, an Internet connection or the like. It is particularly advantageous if the control of the calling communication device can select the chosen communication channel also taking into account the reception quality of the communication partner, because then, for example, a communication connection that is not required can be disconnected if the receive signals are poorer in the case of both the one and the other communication partner than in the case of the preferred communication connection. According to the invention, the calling communication device can also transmit the corresponding information relating to the reception quality to the receiving communication device, which can then carry out the selection of the communication channel. However, this is preferably performed by the calling communication device.

Furthermore, according to the invention, a communication device, preferably the calling communication device, can establish, through comparison of the reception quality with a threshold value, whether the reception quality on one communication connection is so good that the other communication connection can be disconnected, in particular to reduce the connection costs. Insofar as information relating to the reception qualities of the receiving or, more generally, of the other communication partner is available, this information can also be used before a communication connection is disconnected. The decision regarding the maintenance or disconnection of the communication connection is preferably made by the control of the calling communication partner, which normally controls the administration of the call. However, it is also possible according to the invention for the decision regarding the maintenance or disconnection of the communication connection to be made by the control of the receiving communication device.

In a development of the method proposed according to the invention, it can furthermore be provided that, following a disconnection of one mobile radio connection, the other, or a further, mobile radio connection is again set up as soon as the reception quality in the calling and/or the receiving communication device falls below a preset threshold value. The disconnection of one mobile radio connection may have taken place either due to a breakdown in the mobile radio connection or on the basis of a targeted, controlled disconnection, for example for a previously described reason. In this method variant, it is provided in particular that the different audio signals derived from receive signals of the different mobile radio connections are fed at least in the mobile communication device to a delay circuit which realigns the transit time differences and/or the amplitude differences of the different audio signals with one another, i.e., the synchronization of the receive signals according to the invention is again carried out. This always applies whenever a plurality of mobile radio connections are used according to the invention for the communication.

In the event of a deterioration in the reception quality, which is detected as a result of the established reception quality falling below the threshold value, the second or a further communication connection is again set up as a precaution, so that, according to the invention, the mobile radio connection with the best reception quality is selected in each, or at least in the mobile, communication device. It is hereby achieved that the advantages of the invention are automatically reused without user action, even if a connection was disconnected in the meantime for any reasons whatever.

In a particularly preferred embodiment of the method proposed according to the invention, the delay stage can be designed as a digital bucket brigade memory with a downstream correlator to determine the cross-power of the audio signals, wherein the delay is set in such a way that the determined cross-power is maximum. The two receive signals that have been received via the different mobile radio connections are thus brought into phase with one another, i.e., they run absolutely simultaneously. Through a suitable strengthening of both signals, it is furthermore possible to match the respective receive or audio signals with one another in the signal power. This can be achieved according to the invention by the control present in the communication device. An amplifier is preferably provided in each case for this purpose in each receive channel of a mobile radio facility. Thus, the switchover of the receive signals can be effected in a particularly simply achievable manner without the user perceiving a switchover of the receive channel from one mobile radio connection to another as disruptive.

The invention also relates to a communication device, in particular a mobile communication device, for mobile communication with a communication partner device, wherein the communication device has a user interface, a control with a computing unit, in particular a microprocessor, and two communication facilities for setting up different mobile radio connections in different mobile radio networks, the communication facilities being operable independently from one another, in particular in such a way that at least two mobile radio connections can be set up and operated simultaneously.

The control or the computing unit of the control is configured according to the invention to carry out the previously described method or parts thereof.

Particularly preferably, the user interface of the communication device has a microphone input, a loudspeaker output and a command input. The user interface may, for example, be an interface of a conventional telephone, where appropriate also wireless via Bluetooth, WLAN or other conventional communication connections. Particularly preferably, the interface may be an interface to a carphone or a hands-free facility in a motor vehicle.

A particularly preferred use of the method proposed according to the invention relates accordingly to the connection set-up to a mobile communication device in a motor vehicle in which changes in the network quality can often be observed even during a call due to the change of location.

In a further development, it can be provided according to the invention that the microphone input is connected to the at least two communication facilities for the voice signal output, and the loudspeaker output is connected to a signal switch of the control via which the selected receive signal of one of the two mobile radio connections is output as the audio signal.

BRIEF DESCRIPTION OF THE DRAWING

Further advantages, features and possible applications of the present invention can be derived from the following description of an example embodiment and the drawing. All of the described and/or graphically illustrated features, individually or in any combination, form the subject-matter of the present invention, even independently from their combination in the claims or the back-references of the latter.

The single FIG. 1 shows schematically the structure of a communication device according to the invention and the performance of the proposed method.

DETAILED DESCRIPTION OF THE PRESENTLY PREFERRED EMBODIMENTS

FIG. 1 shows a mobile communication device 1 and a communication partner device 2 structurally identical to the mobile communication device 1. A mobile radio communication is intended to take place between the mobile communication device and the communication device 2, wherein one of the communication devices 1, 2 is the calling communication device and the other of the communication devices 2, 1 is the receiving communication device. In the description below, as an example, the mobile communication device 1 is described as the calling communication device and the communication partner device 2 as the receiving communication device.

Each of the communication devices 1, 2 has a first communication facility 3 and a second communication facility 4, which are suitable in each case for setting up mobile radio connections in different mobile radio networks. Each communication facility 3, 4 is therefore designed as a transmitting and receiving facility in a mobile radio network of a mobile radio provider and has, for example, a dedicated SIM card of the mobile radio provider in order to be able to dial into the latter's mobile radio network and take part in the mobile radio communication of this mobile radio provider. Each communication device 1, 2 with the allocated first and second communication facilities 3, 4 is preferably combined in one device.

Furthermore, each communication device 1, 2 has a user interface with a microphone input 6, a loudspeaker output 7 and a command input 8 which may be designed as a man-machine interface (MMI) with a monitor and/or keyboard in order to input and output commands. Commands may be, for example, the input or display of telephone numbers, the lifting or replacing of the receiver.

At least one of the user interfaces 8 of the mobile communication device 1 and of the communication partner device 2 can be designed as a carphone or hands-free facility in a motor vehicle. For this purpose, the communication device 1, 2 can, for example, be connected via Bluetooth to a vehicle system.

Since each communication device 1, 2 in each case has a first communication facility 3 and a second communication facility 4 for the mobile radio, two mobile radio connections can be set up and maintained simultaneously in different mobile radio networks with different providers with these transmitting and receiving components integrated into the communication facilities 3, 4. In the example described, the structurally identical communication devices 1, 2 can be present in both the calling and the called device.

As shown in FIG. 1, in the interests of clarity shown in detail for the communication device 1 only, each of the communication facilities 3, 4 has a microphone input 6 with digital conversion, an amplifier, a sampling rate converter and matching stages 9, which generate an output voice signal XOUT, YOUT, which is output, feedback-free, to voice inputs of the first communication facility 3 and the second communication facility 4. A matching of the signal takes place simultaneously in the matching stages 9. The voice signal generated in the microphone input 6 is fed, in each case split up, to the matching stages 9 and is output to the different communication facilities 3, 4.

Each output voice signal XOUT, YOUT is transmitted via the respective mobile radio connection of the first communication facility 3 or the second communication facility 4 from the mobile communication device 1 to the communication partner device 2 and is fed there as the received voice signal XIN, YIN to the communication partner device 2. Since the internal structure of the communication partner device 2 is not shown in FIG. 1, but corresponds identically to the internal structure of the communication device 1, the treatment of the voice input signals XIN, YIN is described below with reference to the mobile communication device 1.

The voice input signals XIN, YIN are derived as audio signals from the receive signals of the first and second communication facilities 3, 4 and are transmitted to settable delay stages 10. The object of the delay stages 10, in the case of a simultaneously present voice input signal XIN, YIN, is to match both signals with one another, wherein not only delay time differences between the first and the second mobile radio connection but preferably also amplitude differences of both signals are intended to be matched with one another. Following this matching in the delay stage 10, the voice input signals are forwarded to a signal switch 11, which selects one of the two voice input signals XIN, YIN and forwards it for reproduction into a loudspeaker on the loudspeaker output 7 of the user interface 5.

The voice input signal XIN, YIN therefore comprises the audio signals derived from the receive signals of the different mobile radio connections that are fed to the delay circuit or delay stage in order to align transit time differences and/or amplitude differences of the different audio signals derived from the receive signals with one another. The delay circuit 10, also referred to as the delay stage, is preferably designed as a digital bucket brigade memory in each signal path of the audio signals XIN, YIN derived from the receive signals and a downstream correlator 12, which determines the cross-power of the voice input signals XIN, YIN and feeds it to a control 13, which maximizes the cross-power determined in the correlator 12 by the control 13, in that the control 13 sets the delay of the delay circuit 10 accordingly. The control 13 simultaneously controls the amplification of the voice input signals XIN, YIN so that both signals XIN, YIN have the same signal power (amplitude).

Switchover between the voice input signals XIN, YIN can thus be effected by the signal switch 11 for output to the loudspeaker output 7 without a temporal offset or an amplitude offset (sound volume difference) between the two voice input signals XIN, YIN being identifiable for the user. For this purpose, the signal switch 11 is switched according to the invention by a control 14 of the communication facilities 3, 4, designed as a process control, wherein the control 14 evaluates the reception quality of the receive signals of each mobile radio connection and selects the mobile radio connection with the best reception quality for the mobile radio communication by selecting the voice input signal XIN, YIN corresponding to the signal with the best reception quality by the signal switch 11. The control decides, on the basis of the reception quality of the receive signals QX1, QX2 of the respective communication facilities 3, 4 determined by the communication facilities 3, 4, which of the voice signals XIN, YIN is to be selected.

The control 14 can furthermore output connection commands ATX, ATY to control the first and the second communication facilities 3, 4.

The method according to the invention for mobile communication can therefore be carried out with the previously described communication facilities 3, 4 according to the present invention, the aim of which is to be able to switch back and forth between the two voice input signals XIN, YIN (audio signals derived from the receive signals), also understood to be the useful signal, without interference, by the control 14, in fact irrespective of the signal path or voice input signal XIN, YIN that offers the better reception quality. For this purpose, the first and the second communication facility in each case forward their current reception qualities QX, QY, for example in the form of bit error rates, received field strengths or connection status, to the control 14, which selects the respectively better receive path (voice input signal XIN, YIN) through comparison.

With good connection quality, the control 14 can also clear down the respectively poorer mobile radio connection of the first communication facility 3 or the second communication facility 4 in order to save connection costs. However, as soon as the reception quality of the remaining, active mobile radio connections falls below a predefined threshold value, an attempt is made to re-establish the previously disconnected, terminated mobile radio connection. For this purpose, an automatic dial-up of the remote communication partner can be effected in the respectively unused mobile radio network. This is also performed by the control 14 by output of the connection commands ATX or ATY to the first communication facility 3 or the second communication facility 4.

A control 14 of this type can be effected by a process control, which can be simply achieved by a software program implemented on a computing unit, for example a microprocessor. The subscriber numbers to be used in the respective network by the first communication facility 3 and the second communication facility 4 for the communication set-up are received by the calling communication box via the user interface 5 at the beginning of the call, which allows the users to perform the numerical input of the subscriber numbers in the respective mobile radio network or make a selection using electronic telephone directories. This is generally known and does not need to be described in detail. According to the invention, a second subscriber number in a second mobile radio network can be allocated to a first subscriber number in the first mobile radio network, so that, if a subscriber number allocated in this way is present in a second network, the method according to the invention is automatically carried out, wherein a mobile radio connection is set up and maintained in parallel in two mobile radio networks.

The initial call at the beginning of the call is effected simultaneously in both mobile radio networks of the first communication facility 3 and the second communication facility 4. The called communication partner device 2 behaves passively, i.e., it does not autonomously set up a connection. This avoids a collision of the two communication partner devices 1, 2, since they do not call each other simultaneously.

However, since the reception quality of the receiving communication device 2 is unknown to the calling communication device 1, this reception quality of the receiving communication device 2 can be notified on an additional data service of the mobile radio networks and fed to the control 14 of the calling communication device 1. The control 14 can use this information to evaluate the connection quality in both transmission directions in the respective mobile radio network and use it, for example, in order to disconnect one mobile radio connection if the reception quality in both communication devices 1, 2 is sufficiently good.

In a different embodiment for the connection set-up, the called (receiving) communication partner device 2 in a first mobile radio connection of the first communication facility 3 can call the calling communication device 1 on the inactive, second mobile radio connection of the second communication facility 4 in order to set up the parallel connection from two mobile radio networks. If the respective other communication device 1, 2 is in the busy condition, a redial is effected after a random time, which is preferably different for both communication devices 1, 2. In this alternative implementation of the communication set-up, both communication devices 1, 2 act symmetrically, apart from the different times for a redial in the event of a busy condition, i.e., according to the same method.

If both mobile radio networks in the respective receiving situation permit, an attempt is made in both mobile radio networks to re-establish the connection. The same essentially applies accordingly also to the provision of further communication devices that can be operated in parallel.

The particular advantage of the solution described according to the invention is that two competing mobile radio networks that are not aligned with one another can be combined with one another such that a significant improvement, from the perspective of the user, in the speech quality is achieved in poor reception situations of a mobile radio network, since two connections are set up in parallel and the respectively best connection in the receive direction is selected in order to output the input voice signals (audio signals) obtained from the receive signal. It is therefore possible to maintain the connection through changeover of the mobile radio network and to improve the quality of a call in progress without the user having to intervene manually during the call or perceiving the switchover between the two networks as disruptive.

A further advantage of the method proposed according to the invention is that no intervention is required in the existing mobile radio networks and no special network services of the mobile radio providers need to be used.

On the whole, an essentially more interference-free and more reliable mobile radio communication is possible with the method according to the invention or through the use of the communication devices according to the invention. This applies in particular also in the case where the mobile radio networks are not both available at specific locations, since, in this case, at least the respectively available mobile radio network can be selected for the mobile radio communication.

Thus, while there have been shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A method for mobile radio communication between a communication partner device and a mobile communication device, wherein one of the communication devices is a calling communication device and the other of the communication devices is a receiving communication device and wherein at least the mobile communication device has two communication facilities for setting up different mobile radio connections, the method comprising:
conducting a communication, at least temporarily, via at least two different mobile radio connections in two different mobile radio networks;
evaluating the reception quality of receive signals of each mobile radio connection in the mobile communication device;
selecting the mobile radio connection with the best reception quality for the mobile radio communication, at least in a receiving direction;
deriving different audio signals from the receive signals of the different mobile radio connections; and
feeding the derived different audio signals to a delay circuit, which aligns transit time differences and/or the amplitude differences of the derived different audio signals with respect to one another,
wherein the communication partner device of the mobile communication device is also equipped with two communication facilities configured to set up different communication connections, and
wherein the receiving communication device, after receiving a call to initially set up a communication via a first mobile radio connection of the first communication facility:
(a) actively sets up a parallel second mobile radio connection via the second communication facility to the calling communication device, and
(b) autonomously starts a callback to the calling communicating device via the parallel second mobile radio connection.

2. The method as claimed in claim 1, further comprising:
conducting a first communication connection between the first communication facilities of the mobile communication device and the communication partner device; and
conducting a second communication connection between the second communication facilities of the mobile communication device and the communication partner device.

3. The method as claimed in claim 2, wherein, for setting up a communication, the method further comprises:
setting up a mobile radio connection in each case in parallel by the two communication facilities of the calling communication device; and
following establishment of each connection, evaluating the reception quality of the receive signals,
wherein a control decides, on the basis of the receive signal quality, which mobile radio connection is selected for the receive signals.

4. The method as claimed in claim 1, further comprising:
the receiving communication device transmitting information relating to the reception quality of the receive signals in the receiving communication device to the calling communication device.

5. The method as claimed in claim 1, further comprising:
a communication device establishing, through comparison of the reception quality of the receive signals with a threshold value, whether the reception quality on one communication connection is so good that the other communication connection can be disconnected.

6. The method as claimed in claim 1, further comprising:
following a disconnection of one mobile radio connection, re-establishing the other mobile radio connection as soon as the reception quality of the receive signals falls below a preset threshold value; and
feeding the different audio signals derived from receive signals of the different mobile radio connections to a delay circuit to align the transit time differences and/or the amplitude differences of the different audio signals with one another.

7. The method as claimed in claim 1, wherein the delay circuit is a digital bucket brigade memory having a downstream correlator configured to determine the cross-power of the audio signals, wherein the delay is set such that the determined cross-power is maximum.

8. A communication device for mobile radio communication with a communication partner device, the communication device comprising:
a user interface,
a control having a computing unit; and
two communication facilities configured to set up different mobile radio connections in different mobile radio networks,
said two communication facilities being operable independently from one another,
wherein the control, for mobile radio communication between the communication partner device and a mobile communication device, wherein one of the communication devices is a calling communication device and the other of the communication devices is a receiving communication device and wherein at least the mobile communication device has the two communication facilities, is configured to:
conduct a communication, at least temporarily, via at least two different mobile radio connections in two different mobile radio networks;
evaluate the reception quality of receive signals of each mobile radio connection in the mobile communication device;
select the mobile radio connection with the best reception quality for the mobile radio communication, at least in a receiving direction;

derive different audio signals from the receive signals of the different mobile radio connections; and feed the derived different audio signals to a delay circuit, which aligns transit time differences and/or the amplitude differences of the derived different audio signals with respect to one another, wherein the communication partner device of the mobile communication device is also equipped with two communication facilities configured to set up different communication connections, and wherein the receiving communication device, after receiving a call to initially set up a communication via a first mobile radio connection of the first communication facility:

(a) actively sets up a parallel second mobile radio connection via the second communication facility to the calling communication device, and (b) autonomously starts a callback to the calling communicating device via the parallel second mobile radio connection.

9. The communication device as claimed in claim 8, wherein the user interface of the communication device has a microphone input, a loudspeaker output and a command input.

10. The communication device as claimed in claim 9, wherein the microphone input is connected to the two communication facilities for a voice signal output, and the loudspeaker output is connected to a signal switch of the control, via which the selected receive signal of one of the two mobile radio connections is output as the audio signal.

* * * * *